United States Patent [19]
Wight

[11] 3,822,623
[45] July 9, 1974

[54] EXTRUSION CUTTING APPARATUS
[75] Inventor: Edward M. Wight, Austin, Tex.
[73] Assignee: Glacier Industries, Inc., Austin, Tex.
[22] Filed: Jan. 23, 1973
[21] Appl. No.: 326,057

[52] U.S. Cl.................... 83/171, 83/307.1, 83/327
[51] Int. Cl............................ B26d 7/10, B26d 1/56
[58] Field of Search .......... 83/171, 307.1, 321, 327, 83/328

[56] References Cited
UNITED STATES PATENTS
| | | | |
|---|---|---|---|
| 3,244,048 | 4/1966 | Salger | 83/328 X |
| 3,538,606 | 11/1970 | Piatek et al. | 83/327 |
| 3,728,923 | 4/1973 | Lanore et al. | 83/327 X |

Primary Examiner—Willie G. Abercrombie
Attorney, Agent, or Firm—Kenway & Jenney

[57] ABSTRACT

An electrically heated wire is moved through an elliptical path beneath an ice cream extrusion nozzle to slice the extruded stream into bars onto a conveyor which carries the bars into a freezing vault. Below the extrusion nozzle a carriage revolves in a substantially elliptical orbit. The ellipse is located, with respect to the extruded stream, such that the electrically heated cutting wire, mounted on the cutting carriage, makes contact with the stream only while travelling along the flatter side of the ellipse nearest the nozzle. The major elliptical axis can be slanted so that a nearly right-angle cut can be made across the extruding fluid stream. The cutting carriage is free to slide along two supporting bars, both of which are pivotally fastened to two cranks eccentrically mounted on two synchronized rotating shafts. A rotatable center crank revolves in a controllable phase relationship with the outer cranks. This center crank is free to travel within a groove perpendicular to the carriage supporting bars. The outer cranks impart a simple harmonic motion in one direction to the carriage and the center crank imparts another simple harmonic motion to the carriage in a direction perpendicular to the first motion. Changes in the orientation of the major axis are made by altering the phase relationship between the center and outer cranks. Since all points in the cutting carriage travel in parallel planes, multiple cutting wires can be attached to the carriage, thereby allowing it to simultaneously slice multiple nozzle streams. All the cranks are driven by the same motor through a mechanical linkage. The timing of the cutting motion can be changed through simple adjustments in the mechanical linkage.

18 Claims, 8 Drawing Figures

EXTRUSION CUTTING APPARATUS

FIELD OF THE INVENTION

This invention relates in general to the extrusion of soft ice cream products onto a conveyor for hard freezing and more particularly to a cutting mechanism for slicing the extruded stream into bar forms.

Devices for cutting soft ice cream into bars as it is extruded from a nozzle are well known in the prior art. In one such mechanism hot wires are supported by a cutting carriage that is attached to a reciprocating drive air cylinder. The reciprocating air cylinder drives the hot wire through the extruded stream and then retracts it. The reciprocating drive air cylinder is attached to a second reciprocating air cylinder located above it, which raises and lowers the driving cylinder as the wire passes through the stream. In this manner a slanted cut through the moving stream can be obtained and the wire can be retracted without making further contact with the stream. While this device produces essentially flat ice cream bars of uniform shape and thickness, which fall in the same direction as they leave the cutter, it is suitable for use with only a single extrusion nozzle and requires meticulous timing and throttling of the separate air cylinders, in order to achieve the desired path and phase relation to the conveyor. Furthermore, the heavy cycling of the cylinders necessitates frequent adjustment and replacement of portions of the system. Moreover, unless the exit plane of the extrusion nozzle is aligned with the path of the cutting wire through the nozzle stream, the cutter may tend to distort the stream, since, as it is passing through the stream, it is pushing against a progressively longer column of the stream.

A second type of prior art cutting mechanism employs two reciprocating hot wire cutters. In this system the wires approach from opposite sides of the stream and almost meet in the center of the stream. Both wires travel along approximately a straight line and their cutting paths are tilted downward in order to produce a surface that is perpendicular to the stream axis. This device also produces ice cream bars of uniform shape and thickness, which tend to fall in the same direction as they leave the nozzle stream. While this type of cutting mechanism does not produce a distortional force on the cutting stream during cutting, it has the serious drawback that a center ridge is left in the bar after it is cut. Furthermore, this mechanism is also suitable for use with only a single extrusion nozzle. Since the path of each wire is produced by a combination of crank and slider mechanism, which are subject to rapid wear, frequent adjustments and replacements are necessary, which of course interrupt production.

SUMMARY OF THE INVENTION

An electrically heated wire is strung between two supports of a carriage located beneath an extrusion nozzle. As the stream of material passes downward from the nozzle, the wire cuts the stream as it passes through it. A drive mechanism supports the carriage and moves it, and consequently the cutting wire also, along a substantially elliptical path having a major axis which is much longer than its minor axis. The carriage is located with respect to the stream, such that the wire only makes contact with the moving stream along the upper flatter portion of the elliptical path. The tilt of the major axis of this elliptical figure may be adjusted, with respect to the stream, such that the wire can make a right angle cut of the stream.

The drive mechanism includes a pair of parallel supporting bars and the carriage is free to slide along them. At their adjacent ends, the bars are attached to supporting blocks, which are pivotally attached to a synchronized pair of outer cranks, eccentrically mounted on rotatable shafts. As the cranks rotate, the supporting blocks follow a circular orbital motion. Since the carriage is free to slide along the bars, the outer cranks only impart a simple harmonic motion to the carriage in a direction perpendicular to the bars.

A center crank is located between the two outer cranks and is also eccentrically mounted on a rotatable shaft, which rotates in a controllable phase relationship with the two synchronized outer cranks. The center crank rests within a groove in the rear of the cutting carriage, which is perpendicular to the pair of supporting bars. The center crank is free to rotate within, and travel along this groove. Thus as the center crank follows a circular orbit, it imparts to the carriage only a simple harmonic reciprocating motion parallel to the supporting bars.

The outer rotating cranks and the center crank, in combination, produce a substantially elliptical motion of the cutting carriage. When the center crank is in phase with the outer synchronized cranks, one of the axes of the ellipse is aligned with the supporting bars and the other with the groove in the rear of the carriage. The ratio of the radius of the center crank to the radii of the synchronized outer cranks is substantially greater than one; therefore the major axis of the ellipse is substantially longer than its minor axis. If the ellipse's major axis is perpendicular to the stream axis, the cutting wire will produce a slanted cut of the stream. Therefore the phase of the center crank, with respect to the synchronized outer cranks is adjustable, so that the cutting wire can produce a bar with upper and lower surfaces at right angles to its sides.

The synchronized outer cranks and the center crank are all connected to the same driving mechanism by simple mechanical drives. The timing of the driving means may be adjusted, with respect to the position of the receiving conveyor, so that the cutting wire will slice the stream at the proper time. Since every point on the carriage follows parallel paths, multiple cutting wire units can be supported by the same mechanism. Therefore this device can be used to cut multiple streams simultaneously. The speed of the driving mechanism can be stepped up or down according to the number of nozzle streams being cut. During continuous operation, the cutting mechanism follows a repetitive cycle and always cuts in the same direction, entirely across the nozzle stream. The bars produced by it are of uniform shape and thickness and have a smooth upper surface, since the cut is continuous. Since the cut is always in one direction, the bars will all fall in the same direction. While the orientation of the cutting path to the nozzle stream can be selected to provide a bar with upper and lower surfaces at right angles to its sides, this may tend to distort the stream, therefore the phase relationship between the two cranking systems can be adjusted so that the cutting path is substantially parallel to the nozzle exit.

The reciprocating orbital motion of the cutting carriage is generated by a combination of continuously rotating components and reciprocating systems with good acceleration/deceleration characteristics. The three cranks are connected by a simple mechanical linkage to the driving system. This combination results in a smooth running shock-free operation. This combination of two simple harmonic motions connected by a simple mechanical linkages to a single drive, results in smooth trouble-free continuous operation.

BRIEF DESCRIPTION OF THE DRAWING

For a fuller understanding of the nature and objects of the invention, reference should be had to the following detailed description taken in connection with the accompanying drawings in which.

DESCRIPTION OF THE PREFERRED EMBODIMENT

Figure 1:
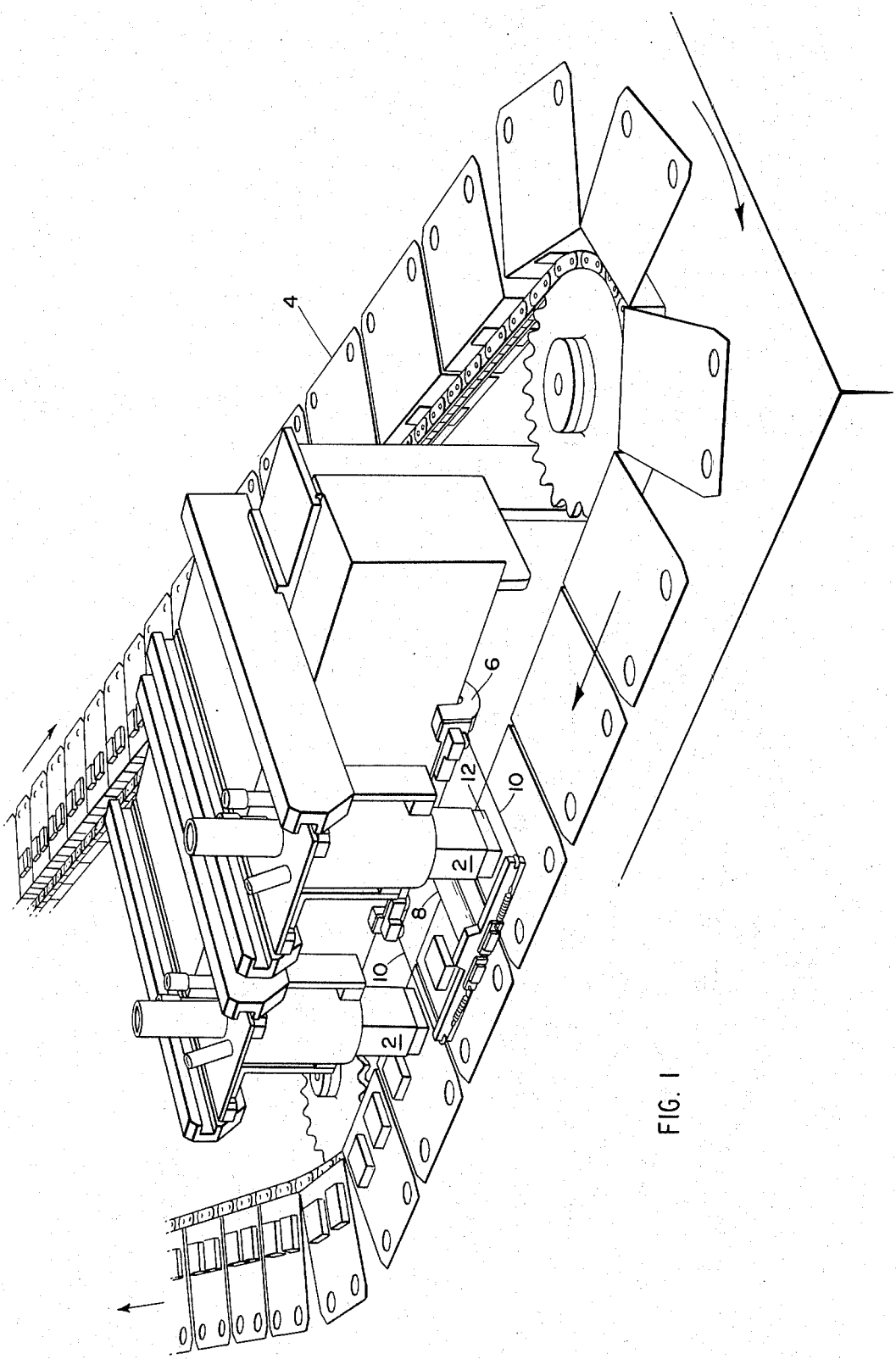
FIG. 1 is a perspective view of the device in accordance with this invention.
Figure 2:
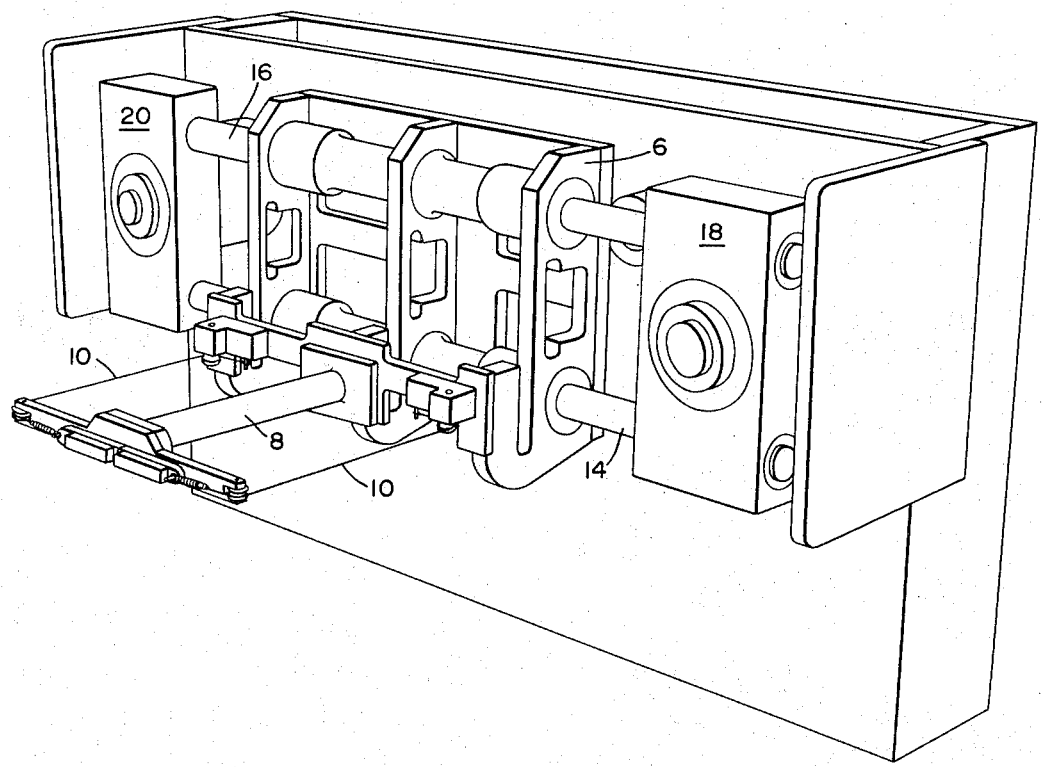
FIG. 2 is a perspective of the cutting carriage in accordance with this invention.

Referring to FIG. 1, carriage 6 and cutting wires 10 are shown located between nozzles 2 and conveyor belt 4. As the food product stream 12 is extruded from nozzles 2, it is sliced by electrically heated wires 10 and falls onto conveyor 4, which carries the sliced product into a freezing vault. In this embodiment each plate of the conveyor 4 carries two bars. Referring to FIG. 2, the cutting bar 8 and cutting wires 10 are attached to the carriage 6, which is supported by bars 14 and 16.

Figure 3:
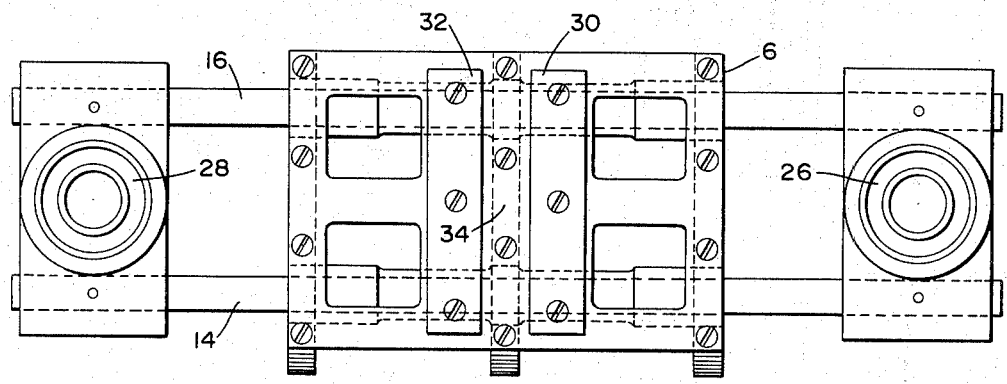
FIG. 3 is a rear elevational view of the cutting carriage in accordance with this invention.

The bars 14 and 16 are parallel to each other and are attached at their adjacent ends to supporting blocks 18 and 20, with carriage 6 free to slide along the bars 14 and 16. As illustrated in FIG. 3, within supporting blocks 18 and 20 are situated bearings 26 and 28. Bars 30 and 32 are secured to the rear of carriage 6 to form a groove 34 that is perpendicular to supporting bars 14 and 16, in a plane parallel to the plane of the bars 14 and 16.

Figure 4:
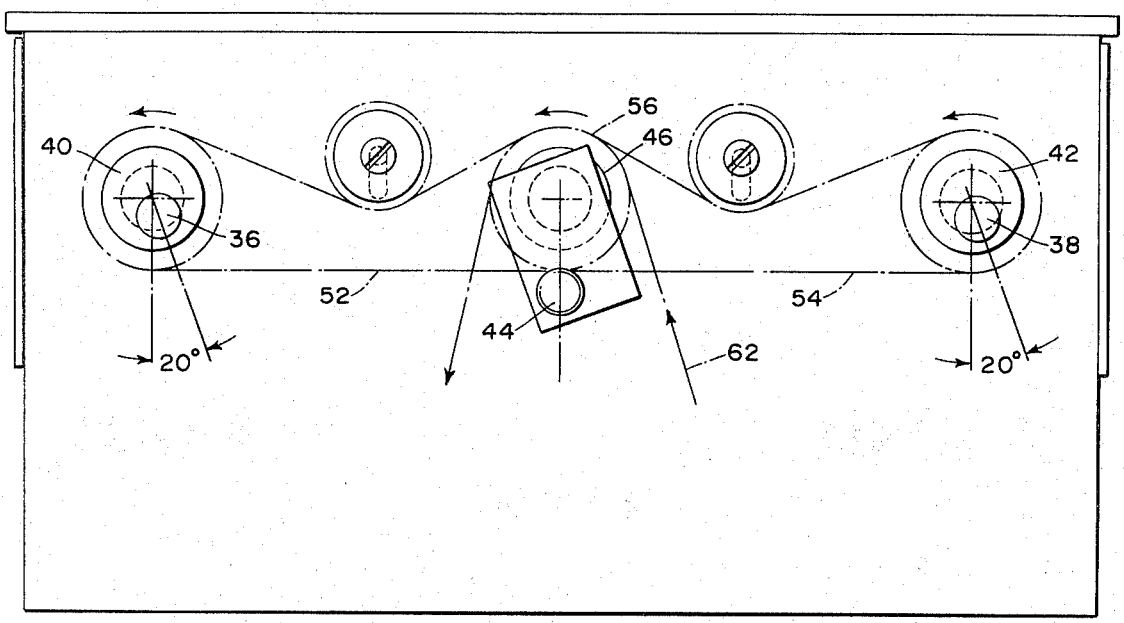
FIG. 4 is a front elevational view of the cranking mechanisms in accordance with this invention.
Figure 5:
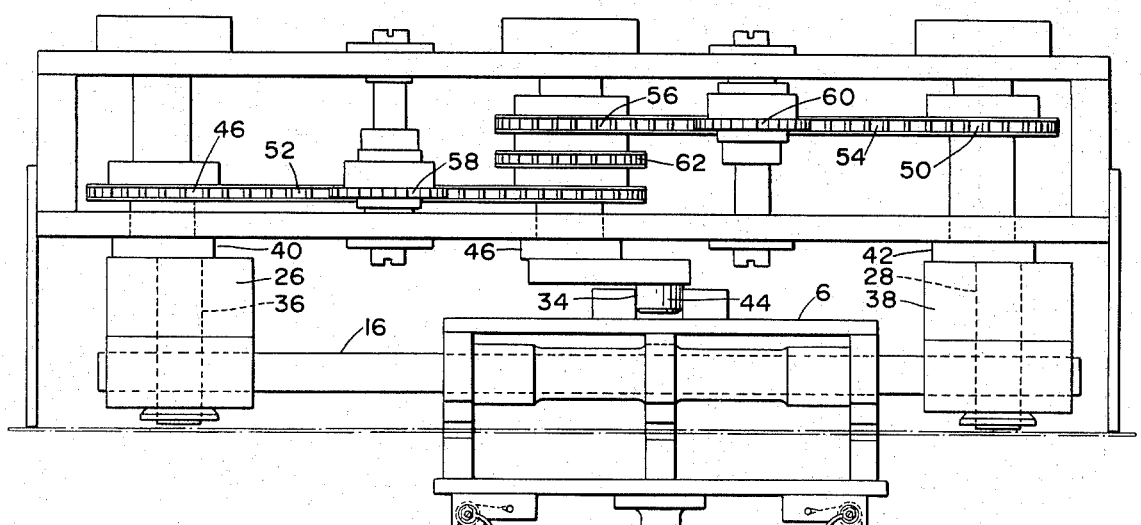
FIG. 5 is a plan view of a device in accordance with this invention.

Referring to FIGS. 4 and 5, side or outer cranks 36 and 38 are eccentrically mounted on side shafts 40 and 42. The side cranks 36 and 38 are shown inserted into their respective bearings 26 and 28. The rotatable center crank 44 is shown within groove 34. As the side shafts 40 and 42 rotate, the side cranks 36 and 38 follow a circular orbital path, thereby moving the ends of the bars in a similar path. Since the carriage 6 is free to slide along bars 14 and 16, side cranks 36 and 38 only induce a simple harmonic reciprocating motion of carriage 6 in a direction perpendicular to bars 14 and 16. Since center crank 44 is free to move along groove 34, in a direction perpendicular to supporting bars 14 and 16, its motion can only cause carriage 6 to slide along bars 14 and 16, without imparting any motion to carriage 6 in a direction perpendicular to bars 14 and 16. Center crank 44 thus causes carriage 6 to oscillate with a simple harmonic motion in a direction perpendicular to the motion induced by side cranks 36 and 38.

Figure 7:
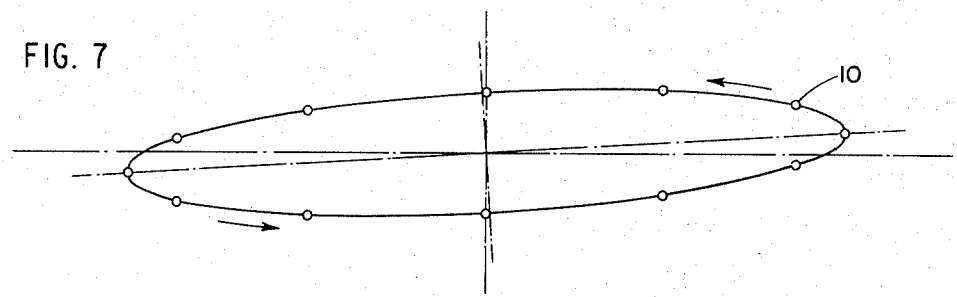
FIG. 7 is a diagramatic illustration of the motion of a cutting wire in accordance with this invention.
Figure 8:
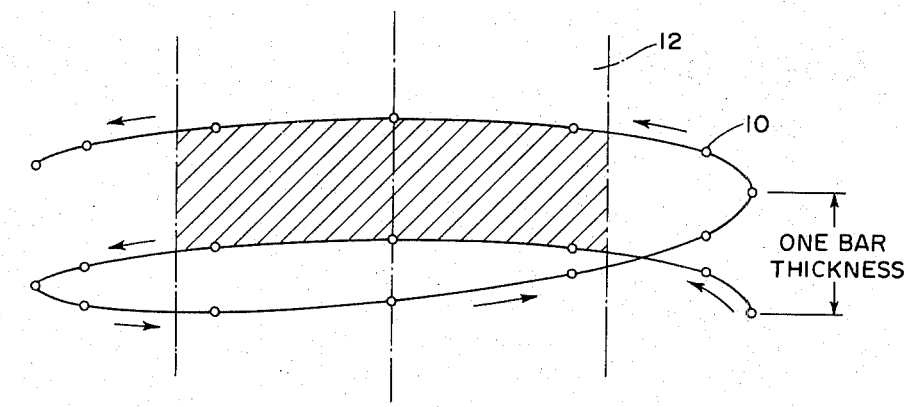
FIG. 8 is a diagramatic illustration of the motion of the cutting wire with respect to the nozzle stream.

The radius of revolution of center crank 44 is much greater than the radii of revolution of the two side or outer cranks 36 and 38. In this arrangement with all three cranks in phase, that is starting from the same point of rotation, carriage 6 traces out a substantially elliptical path. Since the radius of revolution of the center crank 44 is very much greater than the radii of revolution of the two side cranks 36 and 38, the major axis of the ellipse, so produced, is substantially parallel to bars 14 and 16 and substantially longer than the ellipse's minor axis. The speed of the cutting wires 10, with respect to the nozzle stream 12 and the size of the elliptical figure traced out, are selected such that each of the wires 10 is only in contact with the nozzle stream along the flatter portion of the elliptical path, nearest the exit of the corresponding nozzle 2. Since the cutting wires 10 revolve continuously, the base and upper surface of each bar cut are substantially identical, and the bars are of uniform shape and thickness. If the cut is made perpendicular to the stream, the bars will be in the shape of a parallelogram that is so slightly offsquare as to be unnoticable, for reasonable cutting speeds. By slanting the major axis of the ellipse so that the cutting wire 10 has a velocity component in the direction of the nozzle stream, equal to the stream velocity, a bar is formed with two parallel surfaces substantially at right angles to its sides. The angle formed between the major axis of the ellipse and the flow direction of the stream is approximately equal to the arccotangent of the ratio of the velocity of the stream to the average velocity component of the wire 10 in a direction perpendicular to the stream flow direction while in contact with the stream. This path is best illustrated in FIG. 7. In FIG. 8, the path of cutting wire 10 with respect to the nozzle stream 12 is shown for this ideal case. The slight curvature caused by the cutting motion is almost undetectable, after the bar hits the conveyor plates 4, since it tends to flatten out on impact.

The drive system in the mechanism described above is shown in FIG. 6. The specific drive shown may be any suitable motor. One particularly useful arrangement employs the conveyor drive motor to drive the cutting mechanism and therefore the phase relationship between the positions of the conveyor plates receiving the bars and the cutting action remains constant. Sprockets 48 and 50 are mounted on the side shafts 40 and 42 and are driven by driving chains 52 and 54 from center sprocket 56, thus keeping all three cranks 36, 38, and 44 synchronized. Tensional adjustment of driving chains 52 and 54 is made by adjusting idler sprockets 58 and 60. The center sprocket 56 is mounted on center shaft 46 and is driven from a suitable power source by the main drive chain 62. The phase of the center shaft 46, with respect to outer shafts 40 and 42 is determined by the relation of the keying of the sprockets to their respective shafts when the unit is assembled with chains 52 and 54 tight. In this preferred embodiment for a nozzle stream velocity of 1.6 inches per second, a cutting frequency of 2 cycles per second, with the carriage following an elliptical path having a major axis of 5 inches in length and a minor axis of seven-eighths inches in height, I have found that with center crank 44 approximately 20° out of phase (See FIG. 4) with the two side cranks 36 and 38, that I obtained a substantially right angular cut. Changing the phase relationship, between the center crank 44 and the side cranks 36 and 38, to within 5° of being in phase, produced a cutting path that is nearly perpendicular to the stream axis, without producing a bar that is noticably dissimilar in shape, after coming to rest on conveyor 4.

Figure 6:
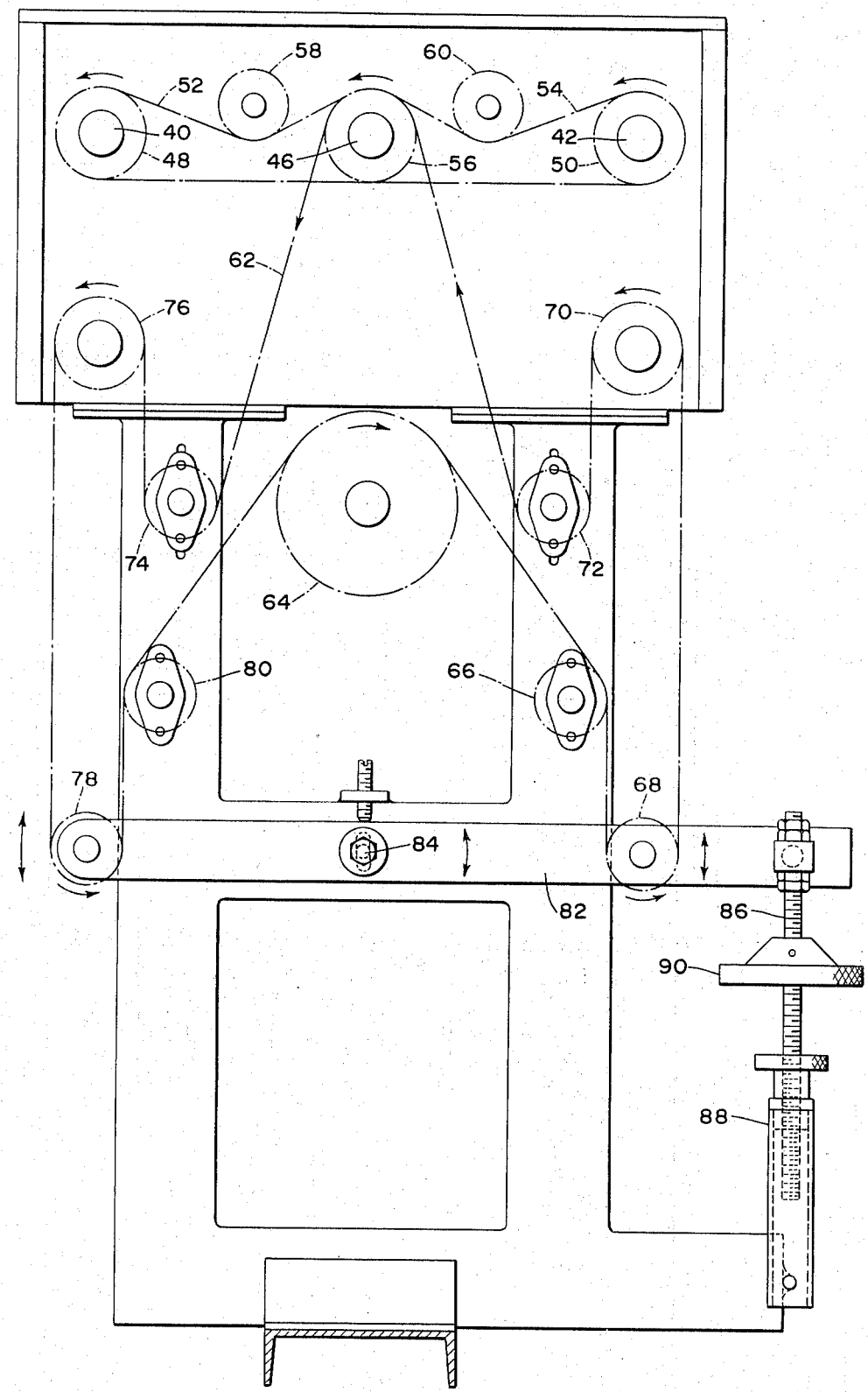
FIG. 6 is a front elevational view of a device in accordance with this invention.

Referring to FIG. 6, the center sprocket 56 is driven from the main driving sprocket 64 by chain 62. Chain 62 passes around driving sprocket 64 over idler 66 around timing adjustment idler 68, around idlers 70 and 72 and then around center sprocket 56. It then returns over idlers 74 and 76, timing adjustment idler 78, idler 80 and returns to driving sprocket 64. This simple mechanical linkage is not subject to rapid fatigue or wear, and since it is self-synchronizing, it requires no adjustment while running. The timing adjustment idlers 68 and 78 are attached to beam 82, on opposite sides of pivot point 84. At one end, the beam 82 is secured to a bolt 86 which is mounted at its opposite end in support 88. A timing adjustment wheel 90 is fixed to bolt 86. When adjustment wheel 90 is rotated, beam 82 pivots about point 84, thus altering the timing of center sprocket 56 with respect to the driving sprocket 64. In this manner, adjustment of wheel 90 during operation one can adjust, with some precision, the phase relationship between the operation of the cutting mechanism and the conveyor 4. Driving sprocket 64 is attached to a geared driving system which can cause step changes in the rotational speed of the driving sprocket 64, to compensate for changes in the number of cutters 10 attached to carriage 6. Typically the gear ratios selected are inversely proportional to the number of cutters 10 carried by carriage 6. For example with dual extrusion nozzles, two cutters may be operated from the same carriage and the frequency of oscillation of each cutter would be reduced by a factor of two.

Since the cutter 10 always cuts in the same direction, the bars all follow the same path as they are cut and therefore are equally spaced on conveyor 4. The cut across the stream is continuous, producing bars with smooth identically shaped upper and lower surfaces, and of uniform shape and thickness. The driving mechanism is a mechanical linkage comprising only smoothly rotating or reciprocating devices, moving in simple harmonic motions, that do not require frequent adjustment and are not subject to rapid fatigue or wear. Timing adjustments and cutting angle changes are simply made. Moreover my invention can be used to simultaneously cut a plurality of nozzle streams, since all points on carriage 6 follow the same parallel paths. Thus my invention is a significant improvement over prior art cutting devices, limited to slicing only single streams and subject to frequent production halts due to breakdown or part replacement.

It will thus be seen that the objects set forth above, among those made apparent from the preceding description, are efficiently attained and, since certain changes may be made in the construction set forth without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. An apparatus for cutting an extruded semi-fluid stream comprising:
    cutting means; and
    driving means for causing said cutting means to trace out a substantially elliptical path in a plane substantially parallel to the direction of flow of said stream, the major axis of said elliptical path being substantially longer than the minor axis of said path, said major axis extending beyond the opposite sides of said stream, and said path being selected so that said cutting means is in contact with and entirely traverses said stream only along the flatter portion of said path on the upstream side of said elliptical path.

2. The apparatus as described in claim 1 further comprising:
    means for altering said driving means to rotate said major axis of said elliptical path.

3. The apparatus as described in claim 1 wherein said major axis is substantially perpendicular to the flow direction of said extruded stream.

4. The apparatus as described in claim 1 wherein the angle formed between said major axis and the flow direction of said stream is substantially equal to the arccotangent of the ratio of the velocity of said stream to the average velocity component of said cutting means in a direction perpendicular to said stream flow direction, when in contact with said stream.

5. The apparatus as described in claim 1 wherein said cutting means is electrically heated.

6. The apparatus as described in claim 1 wherein said driving means for causing said cutting means to trace out a substantially elliptical path, comprises:
    a first means for generating a simple harmonic motion of said cutting means along a first axis; and
    a second means for simultaneously generating a simple harmonic motion of said cutting means in a second direction substantially perpendicular to said first axis.

7. The apparatus as described in claim 6 further comprising a main drive means for driving both of said means for generating simple harmonic motions through a mechanical linkage.

8. The apparatus as described in claim 7 wherein the frequency and phase, with respect to said main drive means, of the motion imparted to said cutting means is adjustable.

9. The apparatus according to claim 6 further comprising means for adjusting the phase relationship between said first means for generating a simple harmonic motion and said second means for generating a simple harmonic motion.

10. The apparatus as described in claim 1 wherein said means for causing said cutting means to trace out a substantially elliptical path comprises:
    a synchronized set of outer cranks;
    a bar pivotally mounted on said outer cranks, such that the revolution of said cranks causes the ends of said bar to follow circular paths;
    a carriage supporting said cutting means, slideably mounted on said bar;
    a center crank located between said set of outer cranks; a guide means in said carriage substantially perpendicular to said bar;
    a rotatable shaft extending from said center crank, such that rotation of said center crank provides a circular arc of motion of said shaft;

said rotatable shaft being in operative contact with said guide means;

a first means for rotating said first set of outer cranks; and a second means for rotating said center crank in a controllable phase relationship with said outer cranks.

11. The apparatus as described in claim 10 wherein both said first means and said second means for rotating are driven by a mechanical linkage from the same driving means.

12. The apparatus as described in claim 11 wherein the frequency and phase, with respect to said driving means, of the motion imparted to said cutting means is adjustable.

13. The apparatus as described in claim 10 further comprising means for adjusting the phase relationship between said first set of cranks and said center crank.

14. An apparatus for cutting an extruded semi-fluid stream, so that the severed portions of said stream fall upon separated plates of a moving conveyor, comprising:

cutting means;

driving means for causing said cutting means to trace out a substantially elliptical path in a plane substantially parallel to the direction of flow of said stream, the major axis of said elliptical path being substantially longer than the minor axis of said path, said major axis extending beyond the opposite sides of said stream and said path being selected so that said cutting means is in contact with and entirely traverses said stream only along the flatter portion of said path on the upsteam side of said path;

a synchronized set of outer cranks;

a bar pivotally mounted on said cranks, such that the revolution of said cranks causes the ends of said bar to follow circular paths;

a carriage supporting said cutting means, slideably mounted on said bar;

a center crank located between said set of outer cranks;

guide means in said carriage substantially perpendicular to said bar;

a rotatable shaft extending from said center crank, such that rotation of said center crank provides a circular arc of motion of said shaft;

said rotatable shaft being in operative contact with said guide means;

a first means for rotating said first set of outer cranks;

a second means for rotating said center crank in a controllable phase relationship with said outer cranks;

a main drive means for driving both said first and second means for rotating, through a mechanical linkage, said linkage having frequency and phase, with respect to said driving means, adjustment means for synchronizing said cutting means with said conveyor.

15. The apparatus as described in claim 14 wherein said main drive means comprises a rotatable driving sprocket linked to both said means for rotating by a flexible chain, and said phase adjustment means comprises a pair of idling sprockets in contact with said chain, one of said idlers being ahead of said driving sprocket and the other idler being behind said driving sprocket, along said chain, both said idlers being mounted on a rotatably adjustable beam.

16. An apparatus for cutting an extruded semi-fluid stream comprising:

a cutting member;

a carriage supporting said cutting member;

drive means for causing said carriage to move in a substantially elliptical path in a plane substantially parallel to the direction of flow of said stream, the major axis of said ellipse being substantially perpendicular to the direction of flow of said extruded stream, said cutting member moving entirely through the extruded stream on the upstream portion of said elliptical path, the velocity of said cutting member over said path and the shape of said ellipse being selected such that said cutting member does not contact said stream on the downstream portion of said path.

17. An apparatus for cutting a plurality of extruded semi-fluid streams comprising:

a set of cutting members each being associated with a single stream;

a carriage supporting said set of cutting members;

drive means for causing said carriage to move in a substantially elliptical path in a plane substantially parallel to the direction of flow of said stream, the major axis of said ellipse being substantially perpendicular to the direction of flow of said extruded streams, said set of cutting members moving entirely through their respective extruded streams on the upstream portion of said elliptical path, the velocity of said cutting members over said path and the shape of said ellipse being selected such that said cutting members do not contact said streams on the downstream portion of said path.

18. The apparatus in accordance with claim 16 further including means associated with said drive means for altering said drive means to rotate the major axis of said elliptical path with respect to the direction of flow of said stream.

* * * * *